United States Patent
Lausch et al.

(10) Patent No.: US 6,367,589 B1
(45) Date of Patent: Apr. 9, 2002

(54) PARKING LOCK FOR AGRICULTURAL IMPLEMENT

(75) Inventors: H. Nevin Lausch, Denver; Joseph N. Smith, Lancaster, both of PA (US)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 09/560,612

(22) Filed: Apr. 28, 2000

Related U.S. Application Data

(60) Provisional application No. 60/162,915, filed on Nov. 1, 1999.

(51) Int. Cl.[7] .................................................. B60T 1/00
(52) U.S. Cl. ....................................................... 188/31
(58) Field of Search ................................ 188/3 H, 3 R, 188/31, 60, 69, 72.1, 114 R, 167, 265; 74/11.3, 532; 303/7

(56) References Cited

U.S. PATENT DOCUMENTS 5,893,439 A * 4/1999 Park ........................... 192/4 A
6,179,092 B1 * 1/2001 Naaktgeboren .............. 188/31

FOREIGN PATENT DOCUMENTS

GB             832372          11/1959

* cited by examiner

Primary Examiner—Christopher P. Schwartz
Assistant Examiner—C. T. Bartz

(57) ABSTRACT

A pull type agricultural implement, such as a round baler, having a main frame, a pair of ground engaging wheels rotatably attached to the main frame for supporting the implement, a hitch assembly for attaching the main frame to a vehicle for towing the implement, and a locking mechanism operatively associated with the main frame for locking at least one of the wheels. The locking mechanism comprises a lock member moveable between a hold position in which the lock member precludes the rotation of the at least one of the wheels and a release position in which the lock member permits rotation of the at least one of the wheels. The locking mechanism further comprises a spring assembly for providing a force for holding the lock member in the hold position, and a camming arrangement for engaging the frame to provide a force to overcome the holding force to urge the lock member out of the hold position to the release position.

4 Claims, 6 Drawing Sheets

PARKING LOCK FOR AGRICULTURAL IMPLEMENT

CROSS REFERENCE TO RELATED APPLICATION

This application claims the benefit of U.S. Provisional Application No. 60/162,915, filed Nov. 1, 1999, and entitled "Parking Lock for Agricultural Implement".

FIELD OF THE INVENTION

The present invention relates to pull type agricultural implements supported on ground engaging wheels, and more particularly to a wheel locking system for such implements when unhitched and left parked in a field, lot or other storage area.

BACKGROUND OF THE INVENTION

Many small agricultural implements, such as round balers, are mounted on ground engaging support wheels and are equipped with a towing bar for coupling the implement to a pulling vehicle, such as a tractor. Because of the relatively small weight of the implement and the low maximum speed of the tractor, it is not necessary to provide the implement with a wheel braking system that operates in conjunction with the tractor braking system. The tractor has the necessary braking capability to stop both the tractor and the towed implement during field operation and transport between fields.

However, when the implement is uncoupled from the tractor and left to stand alone in a field or storage lot, it may be necessary to provide means for preventing the implement from rolling on its wheels and moving from its initial location, e.g., when parked on an inclined surface. It is well known in the art to use wedge shaped blocks in front of, and/or behind, one or both of the wheels to prevent a decoupled implement from moving on sloping ground during storage. Even though implements commonly utilize a pivotally mounted jack extending from the tongue to maintain stability during parking, sufficiently inclined storage areas may still give rise to unwanted movement.

It is also known to use a parking lock for securing one or both wheels to the frame of the implement. For example, the parking lock may comprise a pin which can be inserted into an appropriate receiving cavity on the wheel, as illustrated by the apparatus disclosed in GB Patent No. 823,372. A spring is provided for urging the pin into one of the receiving cavities. For unlocking the wheel, a handle affixed to the pin is turned over along a ramp whereby the pin is lifted and pulled out of the cavity against the force of the spring. For locking the wheel, the handle is turned in the other direction, whereupon the spring forces the pin into one of the cavities.

In prior art locks, such as the one disclosed in the '372 patent, the pin may engage the cavity in such a manner that a substantial force is needed to remove the pin. This may occur under conditions where the implement is parked on a slope or when the towing vehicle maneuvers in a manner that causes the wheels to be stressed. If the pin cannot be removed manually, then the operator must go to the tractor and move the implement in an attempt to relieve the stress. The operator must then dismount from the tractor and return to the implement to manually remove the pin and thereby disengage the lock. This is a time consuming operation, and in some instances must be repeated until the implement is properly maneuvered to a position that relieves the stress.

Another disadvantage of prior art locks, such as the one disclosed in the '372 patent, occurs under conditions where the pin is not aligned to engage the cavity when the implement is parked. It then becomes necessary to utilize the tractor to move the implement in a rocking manner, i.e., back and forth, to facilitate alignment between the pin and the cavity. If this occurs when the implement is parked on a slope, maneuvering the towing vehicle in this manner could cause undue stress on the wheels, or at the very minimum, it adds difficulty to an already time consuming and arduous task. In some instances the operator must repeatedly get off the tractor to visually inspect the implement until it is properly maneuvered to an alignment position, permitting insertion of the pin into the associated cavity.

Another known parking lock solution employs a system that utilizes a hydraulic or electric actuator to remove the pin. The obvious disadvantage of this type of system is the complexity as well as the relative expense when compared to the base cost of the small implement on which it is being used.

SUMMARY OF THE INVENTION

Therefore, an important object of the present invention is to remedy the above problems and provide an agricultural implement equipped with reliable, yet simple and user friendly means for locking and unlocking the wheels of the implement when the implement is parked.

In pursuance of this and other important objects the present invention contemplates a preferred embodiment wherein an improved parking brake is provided for a pull type agricultural implement comprising a main frame, a pair of ground engaging wheels rotatably attached to the main frame for supporting the implement, means for attaching the main frame to a vehicle for towing the implement, and a parking lock operatively associated with the main frame for preventing rotation of one of the wheels, under conditions where said implement is parked, the parking lock comprising a pin moveable between an extended position in which the pin precludes the rotation of the wheel relative to the main frame, and a release position in which the lock member permits rotation of the wheel relative to the main frame. More specifically the improved parking lock contemplates stop means attached to the wheel, which stop means comprise a plurality of radially aligned shoulders mounted in spaced relationship for defining a like plurality of radially receiving cavities for accommodating the pin, resilient means for providing a holding force for urging the pin into a receiving cavity under conditions where it is in the extended position, and camming means for engaging the frame to provide sufficient force to overcome the holding force, whereby the pin is urged out of said extended position to the release position. The holding force of the resilient means is sufficient to hold the pin against any one of said shoulders under conditions where the pin is not aligned with a receiving cavity when the implement is parked.

DESCRIPTION OF THE PREFERRED EMBODIMENT

Figure 1:
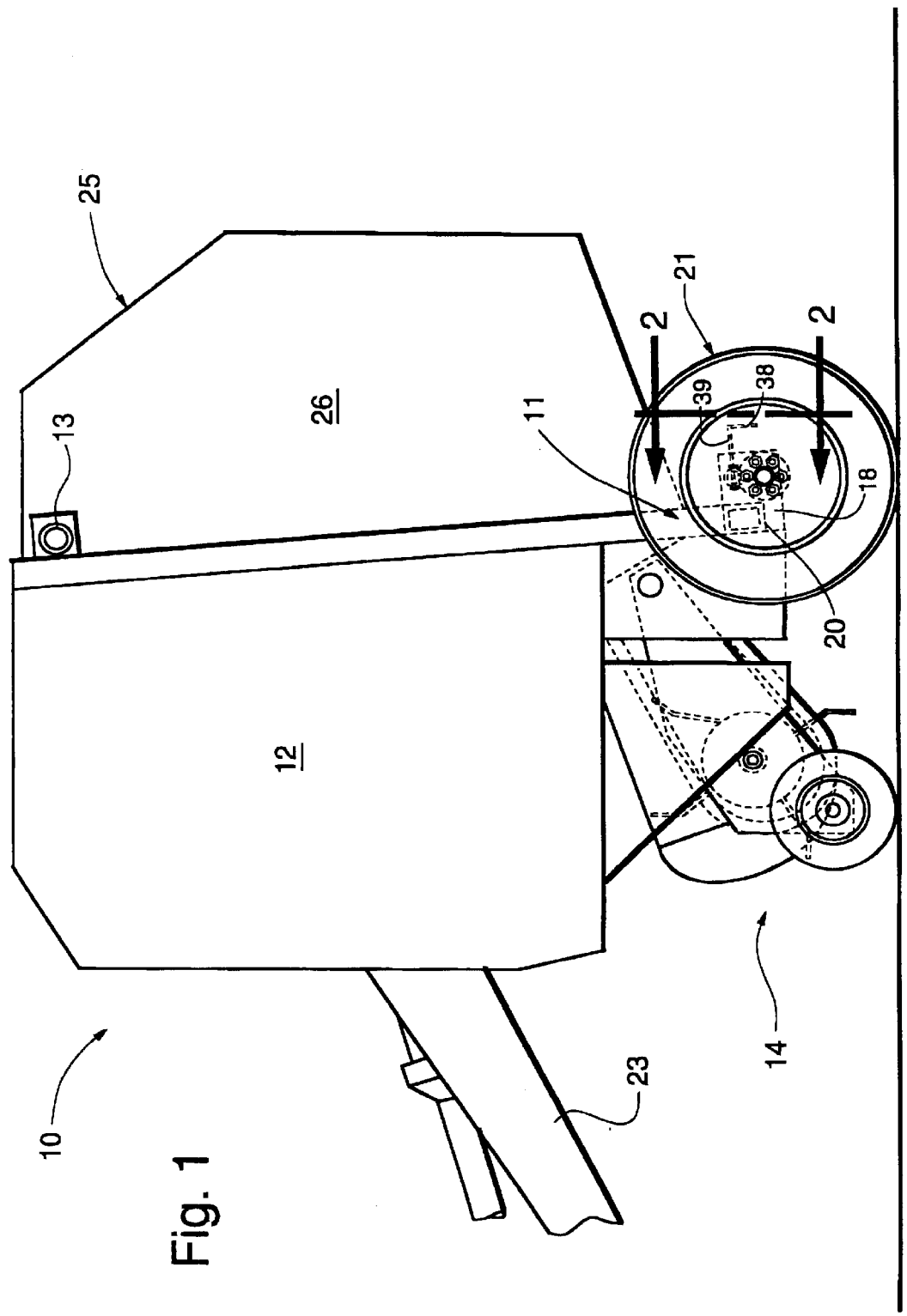
FIG. 1 is a side view of a round baler in which the present invention is readily embodied.

Referring to the drawings for a detailed description of the preferred embodiment of the invention, FIG. 1 shows a towed agricultural implement, round baler 10. As mentioned above the present invention is directed to a parking lock for pull type implements that have been decoupled from a tractor. Although a round baler is shown in the preferred embodiment it should be readily understood that the invention is equally adaptable to any other towed implement where the same problem is prevalent, i.e., the need for locking one or more wheels of a parked pull type implement.

Insofar as the implement being shown to illustrate the invention is concerned, baler 10 comprises a main frame, generally designated by reference numeral 11, on which various elements are mounted for defining a chamber for forming a cylindrical package of crop material that is wrapped and discharged in a conventional manner. Also mounted on the frame is a pickup assembly 14 for picking up crop material, such as hay or straw, from the field and delivering it to a means for feeding it into the bale forming chamber. Formation of a cylindrical package of crop material takes place in this fashion between a pair of opposing sidewalls 12, while baler 10 is being towed across the field. To complete the process, wrapping apparatus (not shown) applies wrapping material such as plastic, twine or net around the peripheral surface of the cylindrical package of crop material. Finally the completed bale is discharged from the chamber to the field.

In baler 10, main frame 11 includes a main support beam 20, to which a pair of ground engaging wheels 21 (only one shown) is rotatably affixed, extending laterally and below the above mentioned pair of sidewalls 12 between which the bale forming chamber is defined. Baler 10 also includes attachment means, i.e., a tongue 23, extending from the forward portion of the main frame for connecting the baler 10 to a towing vehicle, such as a tractor. Pivotally connected to the side walls 12 of the main frame 11 is a tailgate 25, which is closed during bale formation, as shown in FIG. 1, or pivoted open in a counter-clockwise direction about stub shafts 13 to discharge a completed bale. The tailgate includes walls 26 coextensive with sidewalls 12.

Figure 2:
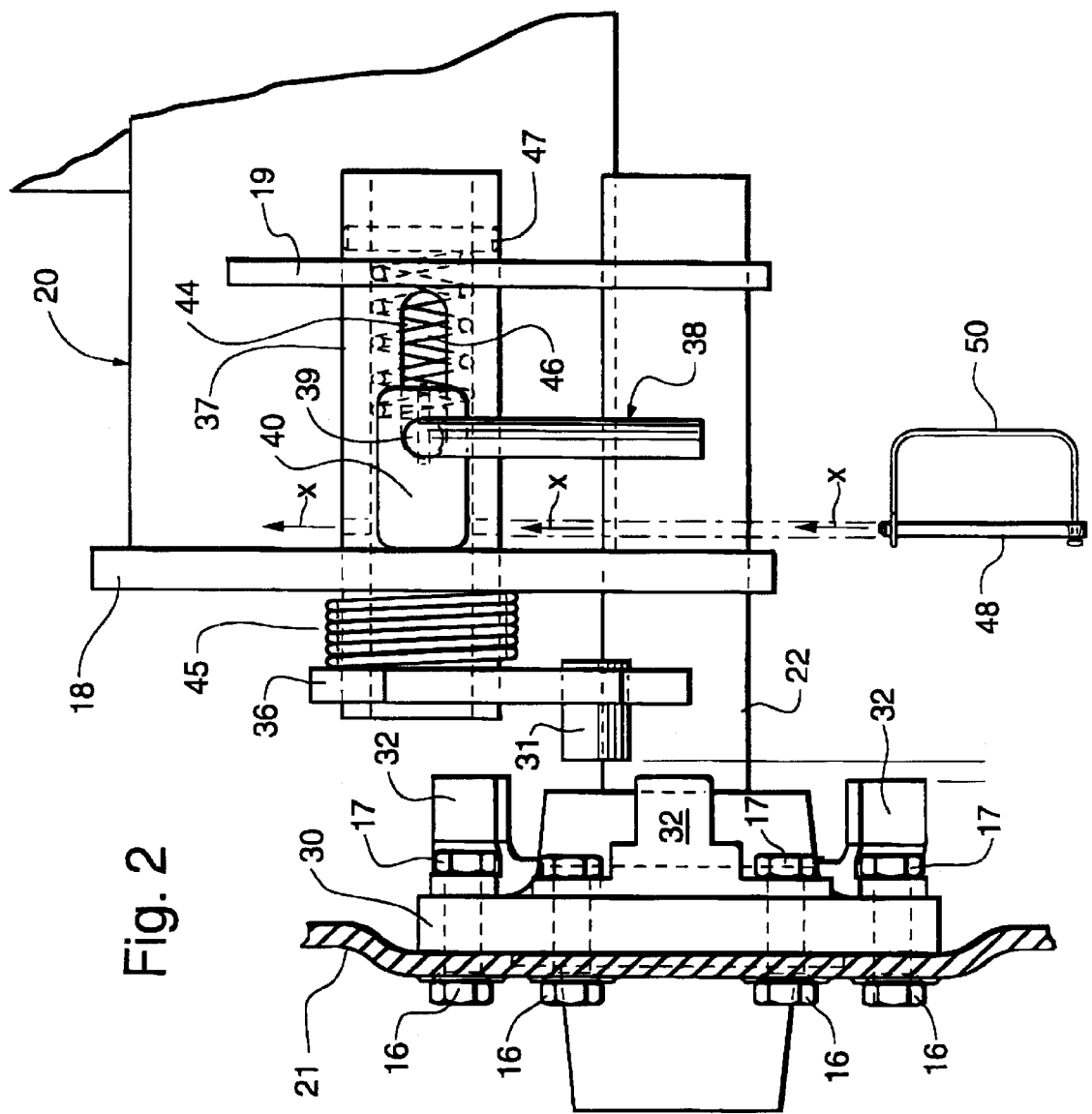
FIG. 2, an elevational view taken along lines 2—2 of FIG. 1, shows the parking lock of the present invention in the disengaged position.
Figure 3:
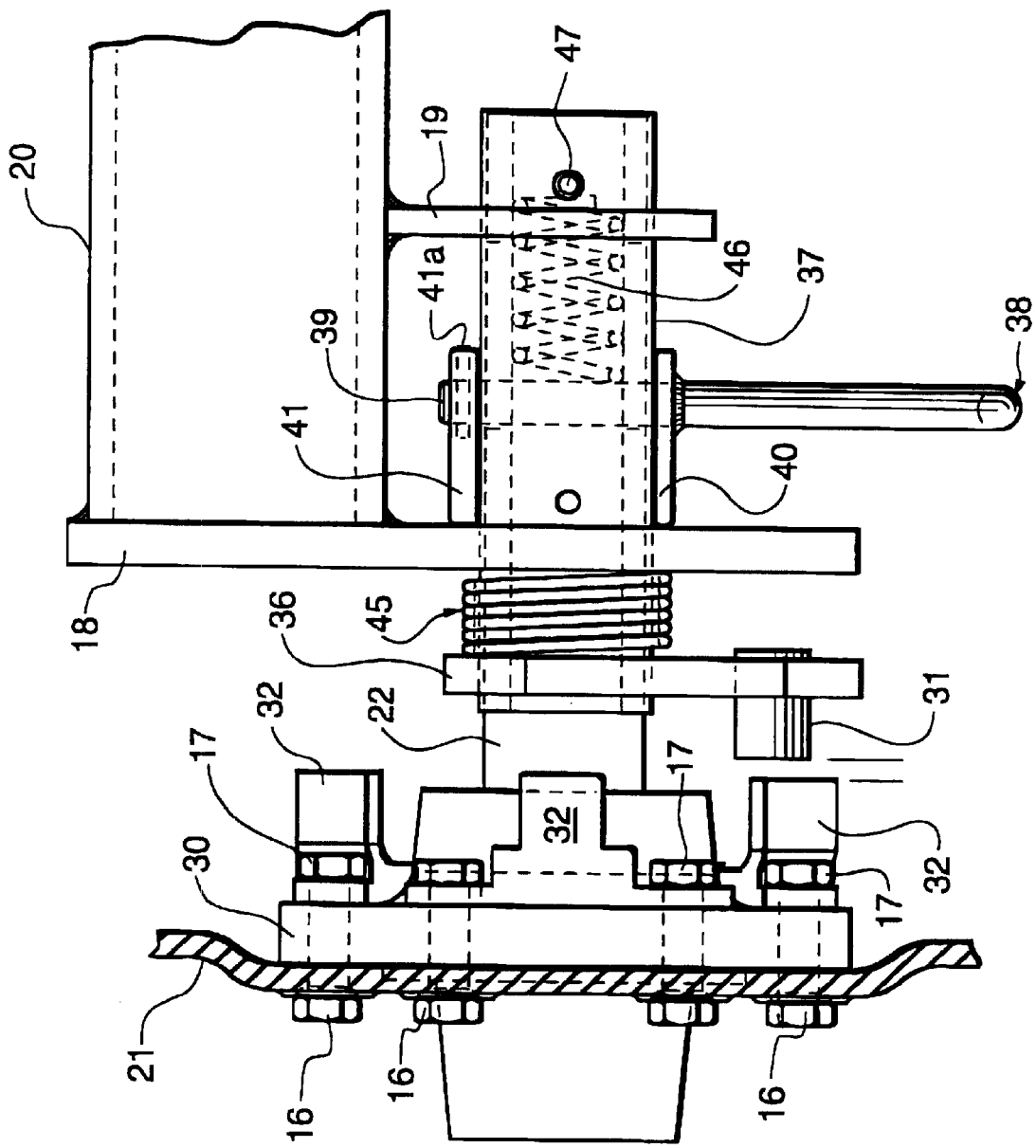
FIG. 3 is a top view of the parking lock shown in FIG. 2 in the disengaged position.

Now turning to FIG. 2, the wheel support area in the vicinity of one end of main support beam 20 is shown for illustrative purposes. Wheel 21 is attached to a hub 30, that is rotatably mounted on shaft 22, which is affixed to beam 20 via end plate 18, welded to the end of beam 20, and intermediate flange 19, also welded to beam 20. Hub 30 is provided with a plurality of mounting bolts 16 and associated nuts 17, for attaching wheel 21 thereto in a conventional manner via appropriate apertures. At the heart of the present invention described in detail below is a unique mechanism for locking wheel 21, via hub 30, to frame 11 and thereby preventing displacement of baler 10 when in the parked condition. This mechanism comprises an assembly for holding a locking pin 31 in either the release position shown in FIGS. 2 and 3, which permits rotation of wheel 21, or the extended position (FIG. 4), whereupon it is disposed in the path of one of the fixed stops 32 secured to hub 30 via nuts 17 and bolts 16, referred to above. Locking pin 31 extends from and is secured to plate 36, which is affixed to moveable brake tube 37, slideably mounted in appropriate apertures in endplate 18 and intermediate flange 19. It should be noted that plate 36 moves along shaft 22 (FIG. 2) when pin 31 is moved back and forth between release and extended positions. To this end shaft 22 is seated in an aperture in the form of a notch in plate 32 in a manner whereby rotation of plate 30 is obviated.

Figure 4:
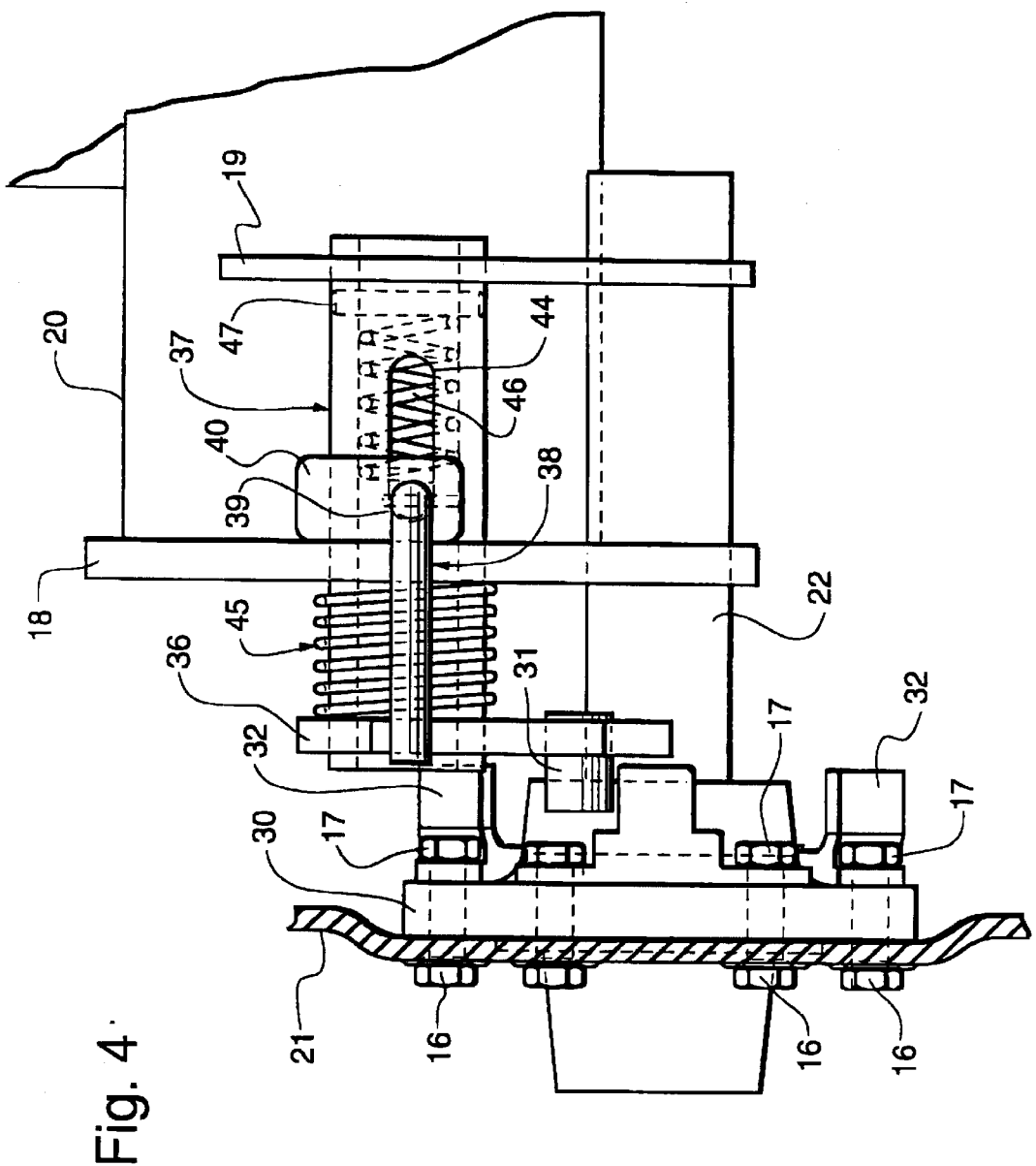
FIG. 4, a view similar to FIG. 2, shows the parking lock in the engaged position.

Returning to the relationship of pin 31 to stops 32, attention is directed to FIGS. 2 and 4 where the reciprocal travel of pin is defined by the release and extended positions, respectively, which illustrates that pin 31 must be moved from the lock position shown in FIG. 4 a sufficient distance to be clear of the travel of stops 32 under conditions where hub 30 is rotating about shaft 22. To accomplish the release of pin 31 from the braking condition, handle 38 is rotated about its shaft 39 which in turn rotates cams 40, 41 against end plate 18. Cam 40 is welded to shaft 39 and cam 41 is held in place by pin 41a for convenient removal of the handle assembly. When handle 38 is rotated about shaft 39, cams 40, 41 engage endplate 18, which in turn permits handle 38 the freedom for movement along a slot 44. This further compresses an outer spring 45 and an inner spring 46, which are both installed under compression. Inner spring 46 is compressed between the portion of shaft 39 that extends into tubular brake rod 37 and pin 47 under conditions where brake rod 37 is urged from left to the right by the action of cams 40, 41 against end plate 18. The purpose of outer compression spring 45 is to assist inner spring 46, as it urges brake rod to the right and thereby move pin 31 to its release position (FIG. 2).

The disengaged position of the brake rod 37, i.e., in a rightmost position (FIG. 4), is maintained during operation and/or transport of the baler. To maintain the brake disengaged, a clipping pin 48 is inserted in the direction of arrows "x" through tubular brake rod 37 (see FIG. 2) and held in place by clip 50.

Figure 5:
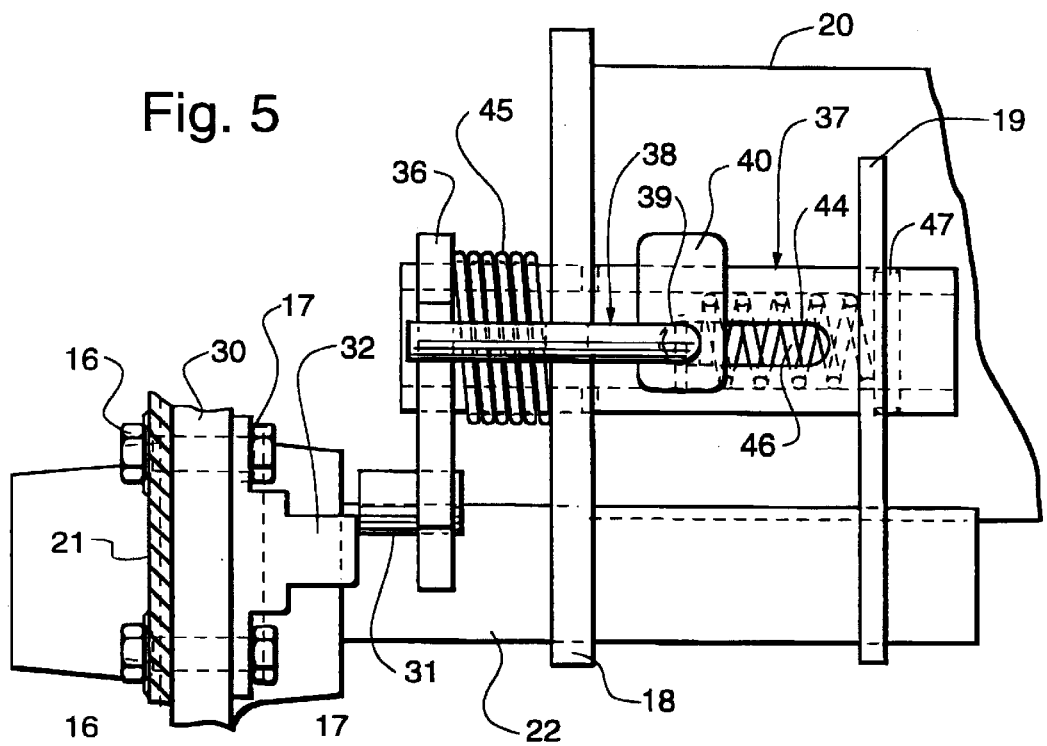
FIG. 5, a view also similar to FIG. 2, shows the parking lock in the position that exists when the implement is parked under conditions where the pin is not aligned with a receiving cavity.
Figure 6:
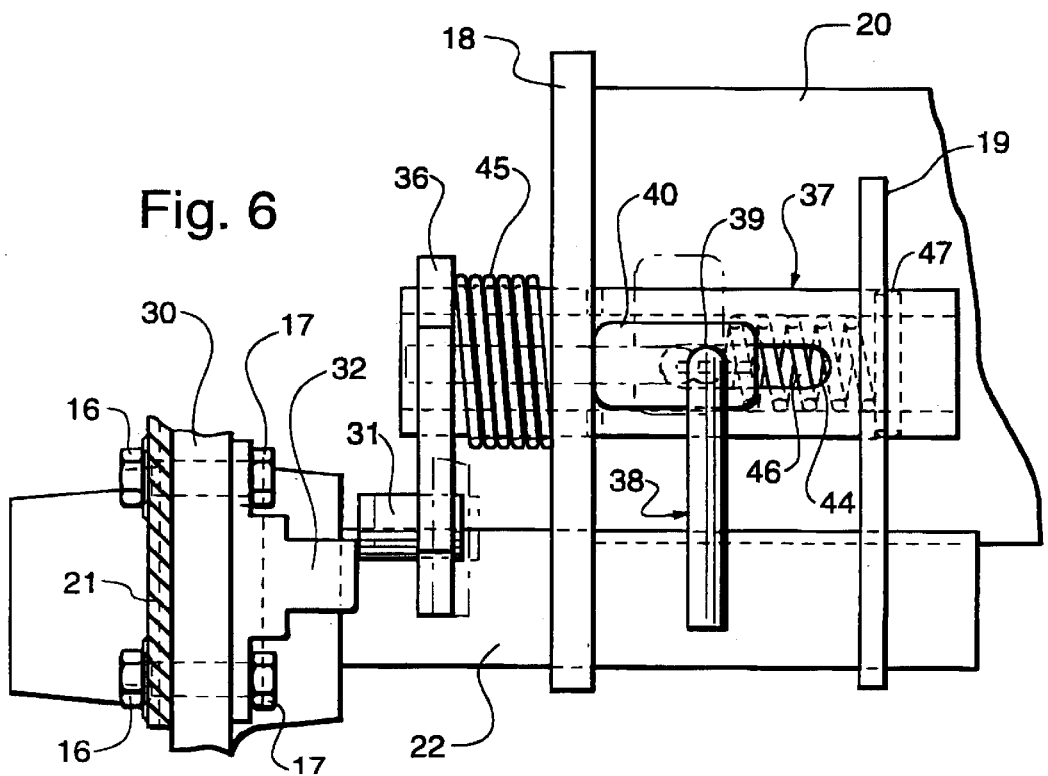
FIG. 6, a view also similar to FIG. 2, shows the parking lock in the instantaneous release position that exists under conditions where the parking lock is disengaged after the implement has been parked on a level surface without the pin aligned with a receiving cavity.
Figure 7:
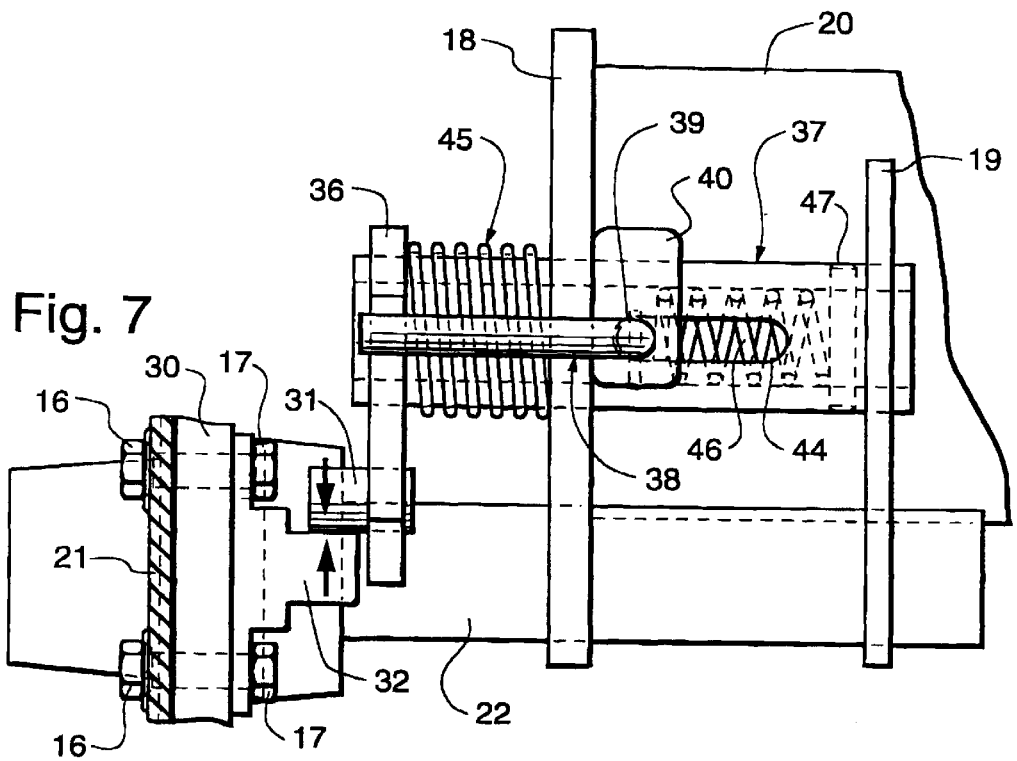
FIG. 7, a view similar to FIG. 4, shows the parking lock in the engaged position with the pin urged against the side of a receiving cavity.
Figure 8:
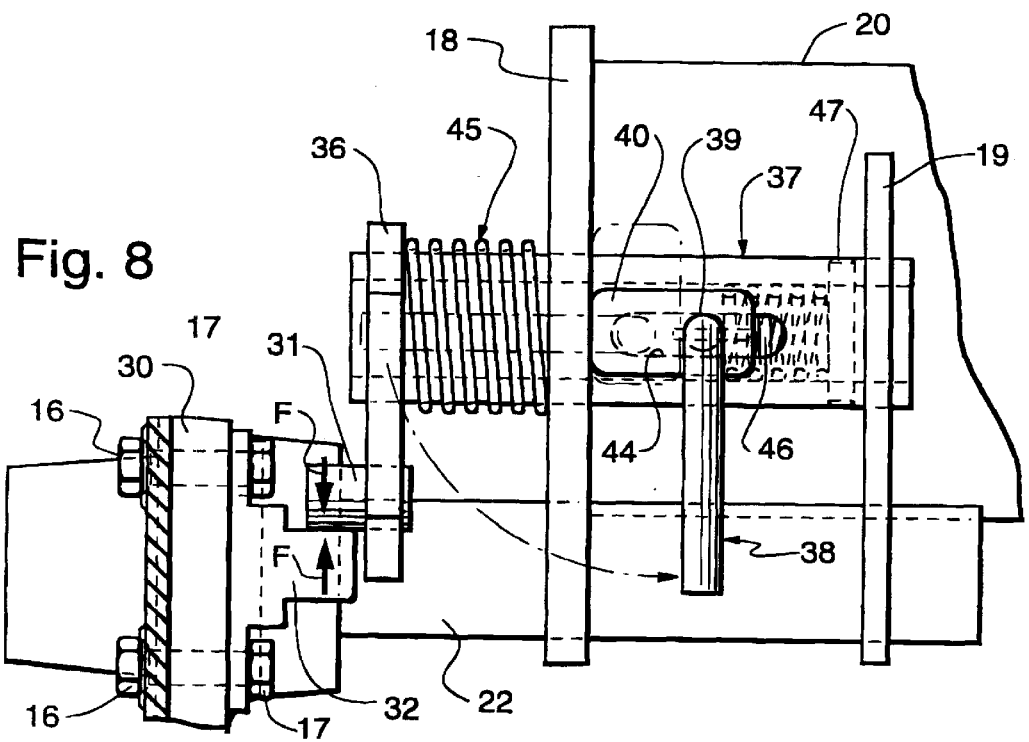
FIG. 8 a view also similar to FIG. 4, shows the parking lock with the pin urged against the side of a receiving cavity and the handle pivoted to the release position.

The foregoing description of the parking lock of the present invention is described under circumstances where pin 31 is aligned with the spaces between stops 32. However, two significant situations arise, where these circumstances do not exist, during which the unique structure of the present invention optimizes operation. In one case, one of stops 32 is aligned with pin 31 when the implement comes to rest in its parked position. This situation is depicted in FIGS. 5 and 6 of the drawings. In another case, the pin is initially properly aligned with one of the spaces between stops 32 to permit extension of the pin to the lock position, but during the time the implement is parked, wheel 21 rotates such that pin 31 is jammed against stop 32 causing a frictional force that prevents release when the handle is rotated. This situation is depicted in FIGS. 7 and 8 of the drawings.

In operation, ill effect of the situation depicted in FIGS. 5 and 6 is obviated by virtue of the unique spring and cam arrangement. In FIG. 5, handle 38 has been pivoted to the hold position similar to the FIG. 4 hold position, but in this instance pin 31 has engaged stop 32 and therefore is not extended to the position shown in FIG. 4. If the implement remains at rest on level terrain, there is no need for a parking lock in this situation, but if the implement shifts and causes wheel 21 to rotate, pin 31 will then automatically extend to the position shown in FIG. 4 and thereby engage the parking lock. On the other hand, if the implement does in fact remain at rest, then when release of the lock is desired, handle 38 is rotated to the release position shown in FIG. 6, which poises the elements to a condition that will automatically release the lock (that was not actually engaged) and return the elements to the FIG. 2 condition.

Turning now to the situation depicted by the arrangement of elements shown in FIGS. 7 and 8, i.e., pin 31 has been extended to the park position (FIG. 7) in the same manner as depicted in FIG. 4, but the implement has subsequently shifted causing wheel 21 to rotate and provide holding force F as pin 31 is jammed against stop 32. The implement remains with the lock so engaged during the time it is parked. When the lock release position of pin 31 is desired, handle 38 is rotated to the position shown in FIG. 8. Shaft 39 is translated left to right along slot 44, further compressing spring 46 but leaving spring 45 unchanged. This poises the parts for release even though the pin and stop remain jammed until wheel 21 is rotated when it is being towed away for field operation. It should be noted that the operator must be aware of this jammed condition via visual inspection to assure that in the event that pin 31 does not initially release automatically the wheel must then be rotated in the opposite direction to release holding force F. As a practical matter, rocking the implement back and forth, a commonly known operating procedure, will suffice, regardless of a visual inspection.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a pull type agricultural implement comprising
   a main frame,
   a pair of ground engaging wheels rotatably attached to said main frame for supporting said implement,
   means for removably attaching said main frame to a vehicle for towing said implement, and
   a parking lock operatively associated with said main frame for preventing rotation of one of said wheels, under conditions where said implement is parked,
   said parking lock comprising a pin moveable between an extended position in which said pin precludes the rotation of said one of said wheels relative to said main frame, and a release position in which said lock member permits rotation of said one of said wheels relative to said main frame, the improvement comprising
   a stop mechanism attached to said one of said wheels,
   said stop mechanism comprising a plurality of radially aligned fixed stops mounted in spaced relationship for defining a like plurality of radially spaced receiving spaces between said stops for accommodating said pin,
   resilient means comprising first and second spring elements in coaxial relationship for providing a holding force for urging said pin into a receiving space under conditions where it is in said extended position, and,
   a cam mechanism for engaging said frame to provide sufficient force to overcome said holding force, whereby said lick pin is urged out of said extended position to said release position,
   said cam mechanism including a cam, a handle attached to said cam, said handle being mounted to pivot said cam between first and second positions engaging said frame, said first position corresponding to said extended position of said pin, and said second position corresponding to said release position of said pin,
   said holding force of said resilient means sufficient to hold said pin against any one of said stops under conditions where said pin is not aligned with a receiving space when said implement is parked.

2. In an improved pull type agricultural implement of the type set forth in claim 1 wherein said parking lock further comprises
   tubular means along which said springs are coaxially mounted under compressive relationship relative to said frame.

3. In an improved pull type agricultural implement of the type set forth in claim 2 wherein said handle further comprises
   a shaft portion extending through said tubular means, said shaft portion adjacent said second spring element for maintaining it under compression when said cam is pivoted to said second position.

4. In an improved pull type agricultural implement of the type set forth in claim 3 wherein said parking lock further comprises
   a mounting plate for mounting said pin on said tubular means, said second spring element disposed between said plate and said main frame for urging said pin toward said extended position under conditions where said cam is pivoted from said second position to said first position.

* * * * *